United States Patent Office 3,423,381
Patented Jan. 21, 1969

3,423,381
SIMULTANEOUS COPOLYMERIZATION AND ALKYLATION OF HETEROCYCLIC N-VINYL MONOMERS WITH α-OLEFINS
Ashot Merijan, Clark, and Frederick Grosser, Midland Park, N.J., assignors to GAF Corporation, New York, N.Y., a corporation of Delaware
No Drawing. Continuation-in-part of application Ser. No. 358,406, Apr. 8, 1964. This application Nov. 18, 1965, Ser. No. 508,546
U.S. Cl. 260—88.1         22 Claims
Int. Cl. C08f 7/12; A61k 7/00; C10m 3/26

This application is a continuation-in-part of our application Ser. No. 358,406, filed on Apr. 8, 1964, now abandoned.

This invention relates to a new process of simultaneously copolymerizing and alkylating heterocyclic N-vinyl monomers with α-olefins to yield a range of copolymers having solubility characteristics in a wide range of solvents, from polar to non-polar, and to the new and useful class of such alkylated copolymers.

It is known that homopolymers of N-vinyl lactams are soluble in water and in a certain class of organic solvents such as alcohols, ether-alcohols, amines, and other polar organic solvents, but insoluble in aliphatic hydrocarbons such as hexane, heptane, cyclohexane, methylcyclohexane, mineral spirits, mineral oil, lubricating oil, and other non-polar organic solvents.

Commercial requirements have arisen for homopolymers and copolymers of N-vinyl lactams which possess the characteristics imparted by the presence of the lactam rings, but which have special solubility characteristics that are dictated by the particular end use in view. For example, polyvinylpyrrolidone, and copolymers of vinylpyrrolidone and vinyl acetate, are very effective as hair-grooming aids, but for certain applications their solubility in water is undesirable. Hence, such polymers with a lower degree of hygroscopicity and an increased moisture resistance are special requirements that have been dictated by the cosmetic trade. In another instance the effectiveness of polyvinylpyrrolidone and copolymers thereof as dispersing agents in lubricating oils cannot be utilized because of their insolubility in the lubricating medium. In still another instance, the excellent adhesive properties imparted to the polymer by the lactam ring are partly vitiated because of poor moisture resistance. A further example is the inability to utilize the excellent complexing ability of polyvinylpyrrolidone as a disperse dye receptor in difficult-to-dye resins such as polyethylene and polypropylene because of the insolubility of polyvinylpyrrolidone in such resins.

It is also known that polymers of N-vinyl lactams in which the regularly recurring lactam rings are substituted by one or more lower alkyl groups can be prepared by conventional polymerization procedures of lower alkyl substituted N-vinyl lactams. Monomers of the latter type, such as N-vinyl-3-butyl pyrrolidone, N-vinyl-5-methyl-5-ethyl pyrrolidone, N-vinyl-3,3,5-trimethyl pyyrolidone, N-vinyl-6-butyl piperidone, N-vinyl-7-ethyl caprolactam, N-vinyl - 3,5 - dimethyl caprolactam, N-vinyl-4-isopropyl caprolactam, N-vinyl-3,5,7-trimethyl caprolactam, etc., when homopolymerized, yield water soluble polymers with additional solubility in lower alcohols, nitroethane, butylamine, etc., but insoluble in hexane, kerosene, mineral oils and other aliphatic and aromatic hydrocarbons. In view of these solubility characteristics, such polymers have limited applications. For example, such polymers cannot be used in applications where waterproofness is a prime requisite. They cannot be used as thickeners in mineral oils or as gloss improvers of waxes and polishes. They are incompatible with waxes and cannot be employed as emollients in cosmetics and soaps.

Copolymers of N-vinyl lactams and methyl acrylate, acrylic acid, vinyl laurate, etc., are also soluble in alcohols, and to varying degrees in water, depending on the character and the amount of the comonomer contained in the copolymer. Solubility in water decreases as the non-polar nature of the comonomer increases and as the percentage of comonomer in the copolymer increases. Such as copolymers are, however, insoluble or partially soluble in the aforementioned aliphatic hydrocarbons.

It is the principal object of the present invention to provide a new class of alkylated copolymers of heterocyclic N-vinyl monomers and α-olefins which have varying degrees of solubility in polar and non-polar solvents and which will meet the uses dictated by commercial requirements.

A further object is to provide a new process of simultaneously copolymerizing and alkylating heterocyclic N-vinyl monomers with α-olefins so as to systematically control the solubility of the alkylated copolymers. Thus, by the proper choice of copolymerizing and alkylating agent (α-olefin) and the degree of copolymerization and alkylation, copolymers are obtained which are soluble in polar solvents, such as alcohols, but which are much less sensitive to moisture, or copolymers which are soluble in aliphatic hydrocarbons of from 6 to 60 carbon atoms including isomers thereof, mineral and lubricating oils having a Saybolt viscosity of from 50 to 200 seconds, or copolymers having intermediate degrees of solubility between polar and non-polar solvents. This systematic control of the solubility characteristics of the alkylated copolymer is achieved without destroying the other desirable characteristics imparted by the heterocyclic ring, and thus alkylated copolymers can be prepared which overcome the deficiencies described above.

Other objects and advantages will become manifest from the following description:

We have found that heterocyclic N-vinyl monomers are readily copolymerized and alkylated with an α-olefin by treating one mole of such monomer with 0.05 to 10 moles of an α-olefin of at least 2 carbon atoms in solution of an organic solvent common to the monomer and the α-olefin in the presence of 0.025 to 0.30 mole of an organic peroxide catalyst per mole of α-olefin at a temperature ranging from 80° to 200° C. for a period of time ranging from 3 to 60 hours. The resulting solution of copolymerized and alkylated copolymer may be employed as such or, if desired, the organic solvent may be removed by vacuum distillation. The solubility of the resulting copolymer in polar solvents decreases and the solubility in non-polar solvents increases as the molar ratio of α-olefin to heterocyclic N-vinyl monomer increases. In other words, alkylated copolymers are obtained in which some or all of the heterocyclic N-vinyl moieties contain one or more alkyl groups of from at least 2 carbon atoms to as many carbon atoms as is contained in the α-olefin employed in the reaction.

The heterocyclic N-vinyl monomers which are simultaneously copolymerized and alkylated with an α-olefin of at least 2 carbon atoms in accordance with the present invention are characterized by the following formula:

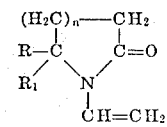

wherein R and $R_1$ are selected from the group consisting of hydrogen, methyl, and ethyl, and $n$ is an integer of from 1 to 3. Such monomers include N-vinyl pyrrolidone, N-vinyl-5-methyl pyrrolidone, N-vinyl-5-ethyl pyrrolidone, N-vinyl-5,5-dimethyl pyrrolidone, N-vinyl-5,5-diethyl pyrrolidone and N-vinyl-5-methyl-5-ethyl pyrrolidone; N-vinyl piperidone, N-vinyl-6-methyl piperidone, N-vinyl-6-ethyl piperidone, N-vinyl-6,6-dimethyl piperidone, N-vinyl-6,6-diethyl piperidone and N-vinyl-6-methyl-6-ethyl piperidone; N-vinyl caprolactam, N-vinyl-7-methyl caprolactam, N-vinyl-7,7-dimethyl caprolactam, N-vinyl-7-ethyl caprolactam, N-vinyl-7,7-diethyl caprolactam and N-vinyl-7-methyl-7-ethyl caprolactam, as described in United States Patents 2,265,450; 2,317,804; 2,335,454 and many others too numerous to mention in which working examples of some of the species characterized by the above formula are given.

Another group of heterocyclic N-vinyl monomers comprises comparable monomers of the corresponding N-vinyl 5-, 6- and 7-membered thiolactams, i.e., wherein oxygen of the carbonyl function in the foregoing formula is replaced by sulfur; N-vinyl succinimide, N-vinyl diglycolylimide, N-vinyl glutarimide, N-vinyl-3-morpholinone, N-vinyl-5-methyl-3-morpholinone, N-vinyl-5-ethyl-3-morpholinone, and N-vinyl oxazolidone.

Still another group of N-heterocyclic monomers includes polymerizable monomers obtained by the reaction of 5-, 6- and 7-membered lactams with acryloyl or methacryloyl chloride or bromide in the presence of a hydrogen halide acceptor such as pyridine, dimethylaniline, etc., having the structure:

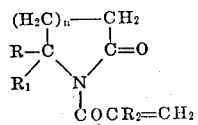

wherein R, R₁, and n have the same values as above, and R₂ is either hydrogen or methyl. Illustrative compounds are N-methacryloyl-pyrrolidone, -piperidone and -caprolactam; N-methacryloyl-5-methylpyrrolidone, N-methacryloyl-6-methylpiperidone and N-methacryloyl-7-methyl caprolactam; N-acryloyl-pyrrolidone, -piperidone and -caprolactam; N-acryloyl-5-methylpyrrolidone, N-acryloyl-6-methylpiperidone and N-acryloyl-7-methyl caprolactam; compounds having the structure:

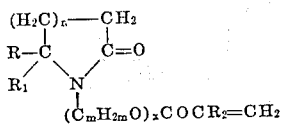

wherein R, R₁ and n have the same values as above, R₂ is either hydrogen or methyl, x is an integer of from 1 to 4, and m is an integer of from 1 to 4 when x has a value of 1 and from 2 to 4 when x has a value greater than 1. Illustrative compounds are N-acryloxymethyl-pyrrolidone, -piperidone and -caprolactam; N-methacryloxyethoxyethyl-pyrrolidone, -piperidone and -caprolactam; N-methacryloxypropyl-pyrrolidone, -piperidone and -caprolactam; N-methacryloxymethyl-5-pyrrolidone, -piperidone and -caprolactam; N-methacryloxyethyl-5-pyrrolidone, -piperidone and -caprolactam; N-methacryloxymethyl-5-methylpyrrolidone, -6-methylpiperidone and -7-methylcaprolactam, including acrylamido- and methacrylamidolactams of the structure:

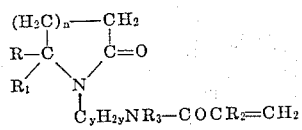

wherein R, R₁ and n have the same values as above, R₂ is either hydrogen or methyl, R₃ represents hydrogen, an alkyl of from 1 to 4 carbon atoms or phenyl group and y represents an integer of from 1 to 3. Illustrative compounds of this type are N-methacrylamidomethyl-, N-methacrylamidoethyl-, N-methacrylamidopropyl- and N-(N - phenylacrylamidopropyl)-pyrrolidones, -piperidones and -caprolactams, which are readily prepared by reacting acryloyl or methacryloyl chloride or bromide with an N-(aminoalkyl)-lactam in the presence of any conventional base to take up the hydrogen halide.

It is to be understood that the nature or character of the N-heterocyclic polymerizable monomer that may be used in the process of the present invention is immaterial so long as it contains a carbonyl function in the ring adjacent to the nitrogen atom thereof and at least one active proton in its monomer moiety. Such monomer will copolymerize with an α-olefin or halo-α-olefin and alkylate with the said α-olefin as will be pointed out hereinafter.

Any α-olefin having a molecular weight from about 28 to as high as 2500 may be employed as the co-monomer and in the alkylation of the active sites in the moieties of the N-heterocyclic monomer during the simultaneous copolymerization and alkylation reaction. In other words, α-olefins ranging from ethene (ethylene) to as high as α-olefins ranging from ethene (ethylene) to as high as polybutenes having molecular weights from 400 to 2500 may be employed. As examples of such α-olefins the following are illustrative: ethene; propene; 1-butene; 1-pentene; 2-ethyl-1-butene; 2-methyl-1-pentene; 1-hexene; 5-methyl-1-hexene; 2-methyl-1-pentene; 1-hexene; 5-methyl-1-hexene; 2-methyl-1-pentene; 3-ethyl-1-pentene; 1-heptene; 1-octene; 1-nonene; 2-ethyl-1-hexene; 1-decene; 1-dodecene; 1-tetradecene; 1-hexadecene; 1-heptadecene; 1-octadecene; 1-nonadecene; 1-eicosene; 1-docosene; 1-tetracosene; 1-pentacosene; trimerized α-tetradecene and polybutenes of molecular weight of 400 to 2500 may be used.

While linear α-olefins are preferred because of their commercial availability, numerous isomers of α-olefins ranging from 1-pentene to 1-pentacosene as well as polybutenes may also be employed in the alkylation reaction. The only precaution required in such case is that the isomer contain an ethylenic unsaturation in the α-position thereof.

A mixture of commercially available linear α-olefins produced by cracking petroleum wax or by polymerizing lower olefins may also be used as the co-monomer and alkylating agent. Alpha-olefins in the carbon range of from C₆–C₇; C₇–C₉; C₉–C₁₁; C₁₁–C₁₅; and C₁₅–C₂₀ are commercially available and contain from 81 to 87 weight percent of straight-chain α-olefins; from <0.5 to 2 weight percent of straight-chain internal olefins; from 13 to 3 weight percent of branched and naphthenic olefins; from 2 to 4 weight percent of paraffins and naphthenes and from 1 to <1 of aromatics, respectively. A mixture of α-olefins containing from 65–75% of α-olefins of from C₂₀ to C₄₂ and having an average molecular weight of 366 is also commercially available and such mixture is employed in the alkylation reaction.

Instead of employing ethylene (ethene) as the co-monomer and alkylating agent, monohalo-α-olefins and polyhalo-α-olefins of at least 2 carbon atoms (hereinafter referred to simply as halo-α-olefins), such as, for example, dichlorovinylidene fluoride (CCl₂=CF₂), chlorovinylidene fluoride (CHCl=CF₂), chlorotrifluoroethylene (CClF=CF₂), tetrafluoroethylene (CF₂=CF₂), tetrachloroethylene (CCl₂=CCl₂), vinylidene fluoride (CH₂=CF₂), vinylidene bromochloride, i.e., 1-bromo-1-chloroethylene (CH₂=CBrCl), vinylidene bromofluoride (CH₂=CBrF), vinylidene chlorofluoride (CH₂=CClF), 1,2-dichloro-1,2-difluoroethylene (CClF=CClF), 1,2-difluoroethylene (CHF=CHF), 1-chloro-2-fluoroethylene (CHF=CHCl), 1-bromo-2-fluoroethylene

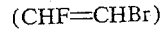

1-dichloro-2-fluoroethylene (CHF=CCl₂), 1-bromo-1,2-difluoroethylene (CHF=CBrF), 1-dibromo-2-fluoroethylene (CHF=CBr₂), trichloroethylene (CHCl=CCl₂), 1-chloro-1,2-dibromoethylene (CHBr=CBrCl), trifluoroethylene (CF₂=CHF), tribromoethylene (CHBr=CBr₂), 1-bromo-2-difluoroethylene (CF₂=CHBr), 1-chloro-1-bromo-2-difluoroethylene (CF₂=CBrCl), 1-dibromo-2-difluoroethylene (CF$_2$=CBr$_2$), 1-dichloro-2-difluoroethylene (CF$_2$=CCl$_2$), 1-bromo-2-fluoroethylene (CHF=CHBr)

1-chloro-2-difluoroethylene (CF$_2$=CHCl), 1-dichloro-2-difluoroethylene (CF$_2$=CCl$_2$), chlorotrifluoroethylene (CF$_2$=CClF), bromotrifluoroethylene (CF$_2$=CBrF), fluorotrichloroethylene (CCl$_2$=CClF), trichloroiodoethylene (CCl$_2$=CCII), chlorodiiodoethylene (CHCl=CI$_2$)

1,2-dichloro-1,2-diiodoethylene (CCII=CCII), 1-bromo-2-iodoethylene (CHI=CHBr), 1-iodo-2-chloroethylene (CHCl=CHI), allyl chloride (CH$_2$=CH—CH$_2$Cl), 4-chloro-1-butene (CH$_2$=CH—CH$_2$—CH$_2$Cl), 3,3,4,4,4-pentafluoro-1-butene (CH$_2$=CH—CF$_2$—CF$_3$), 5-chloro-1-pentene (CH$_2$=CH—CH$_2$—CH$_2$—CH$_2$Cl), 3,3,4,4,5,5,5-heptafluoro-1-pentene (CH$_2$=CH—CF$_2$CF$_2$CF$_3$), 3,3,4,4,5,5,6,6,6-nonafluoro-1-hexene (CH$_2$=CH—CF$_2$—CF$_2$—CF$_2$—CF$_3$)

etc., may be used to yield a series of a new class of monohaloalkylated and polyhaloalkylated copolymers of heterocyclic N-vinyl monomers.

It is to be noted that both the carbon chain length and the number of halogen substituents on the carbon atoms of the above halo-α-olefins are immaterial so long as the monohalo- and polyhalo-α-olefins contain an ethylenic unsaturation in alpha-position. Accordingly, the chain length of such halo-α-olefins may range beyond 6 carbon atoms.

In carrying out the simultaneous copolymerization and alkylation reaction, an organic solvent is employed which is common to the alpha-olefin, halo-α-olefin and the heterocyclic N-vinyl monomer. As solvents, various alcohols, such as methanol, ethanol, propanol, isopropanol, butanol, sec-butanol, amyl alcohol, hexanol, 2-ethyl-1-hexanol, ethylene glycol, 1,2-butanediol, 4-butanediol, etc., may be employed. Other solvents such as diethylene glycol, ethylene glycol monomethyl ether and the like may also be employed. It is to be noted that the nature or character of the organic solvent is immaterial so long as it forms a solution with the heterocyclic N-vinyl monomer, alpha-olefin(s), and halo-α-olefin(s), and is relatively inert toward alkylation.

The amount of inert organic solvent employed is not critical. Any amount which will yield a solution of the heterocyclic N-vinyl monomer and alpha-olefin or halo-α-olefin will suffice. However, for purposes of expediency, we found that for every part by weight of heterocyclic N-vinyl monomer, from two to ten parts or organic solvent, either by volume or by weight, are sufficient to yield a workable solution.

As peroxide catalysts (initiator) for the polymerization and alkylation reaction, any one of the known tertiary-alkyl organic peroxides and hydroperoxides such as, for example, di-t-butyl peroxide, t-butyl perbenzoate, di-t-butyl perphthalate, t-butyl-pentamethyl-ethyl peroxide, t-butyl-triphenylmethyl peroxide, di-t-amyl peroxide, bis-(triethylmethyl) peroxide, bis-(triphenylmethyl) peroxide, 2,5-dimethyl-hexyl-2,5-dihydroperoxide, 2,5-dimethyl-2,5-di(t-butyl peroxy) hexane, 2,5-dimethylhexyl-2,5-di(peroxy benzoate), t-butyl hydroperoxide, para-menthane hydroperoxide and the like may be used.

Where it is desired that the alkylated copolymer be soluble in an aliphatic liquid hydrocarbon of 6 or more carbon atoms, a mineral oil or lubricating oil of a paraffinic stock, the simultaneous copolymerization and alkylation reaction is conducted in the presence of any one of the foregoing solvents. When the desired degree of copolymeriation and alkylation has been obtained, the reaction mixture is subjected to vacuum distillation and the removed solvent is replaced by a saturated aliphatic hydrocarbon having a boiling point higher than the solvent. After the solvent has been removed there is obtained a solution of the alkylated copolymer in solution of the aliphatic hydrocarbon. Saturated aliphatic hydrocarbons having a boiling point higher than solvents are legion and commercially available. Hence, no difficulty should be encountered in the selection of such hydrocarbon in preparing a solution of the alkylated copolymer.

When low-boiling α-olefins of from 2 to 6 carbon atoms or low boiling halo-α-olefins are employed in the reaction, in such case the organic peroxide catalyst, preferably di-t-butyl peroxide, and the solution of the heterocyclic N-vinyl monomer are added into a stainless steel rocker bomb. The low-boiling α-olefin or halo-α-olefin is then charged to the bomb and the bomb heated and maintained at the same temperature and period of time as noted above. The pressure developed in the bomb may range from 100 to 1000 p.s.i.g. After cooling the contents of the bomb to room temperature, they are discharged into any suitable distillation equipment to remove the solvent and volatiles and the residual product recovered either as a solid ranging from a waxy to crystalline solid, or as a viscous liquid.

The percent of the α-olefin or halo-α-olefin consumed in the simultaneous copolymerization and alkylation reaction ranges from 50% to 100% of the α-olefin charged. It is to be noted that in this reaction some homopolymerization of the α-olefin takes place to the extent of 5 percent of the α-olefin consumed as determined by thermal gravimetric analysis (TGA).

The degree of copolymerization and alkylation of the heterocyclic N-vinyl monomers with α-olefins and halo-α-olefins, and the isomeric distribution of the alkyl groups in the moieties of such monomers, were determined by a systematic quantitative study of numerous alkylated copolymers prepared in accordance with the present invention and their thermally degraded products by means of elemental analysis, vapor phase chromatography (VPC), infrared (IR) and nuclear magnetic resonance (NMR) spectroscopy. The data obtained from this extensive study showed several generalizations from which the following equations were established:

The degree of copolymerization and alkylation based on the moles of α-olefin (or halo-α-olefin) charged in the reaction is determined by the following equation:

(1) The mole percent of α-olefin copolymerized and alkylated=mole percent of α-olefin consumed ×95%

The degree of copolymerization of the α-olefin charged is determined by the following equation:

(2) The minimum (a) and maximum (b) mole percent of the α-olefin copolymerized=

(a)

$$\frac{\text{Moles of heterocyclic N-vinyl monomer charged}/100}{\text{Moles of }\alpha\text{-olefin charged}} \times 100$$

(b)

$$\frac{\text{Moles of heterocyclic N-vinyl monomer charged}/10}{\text{Moles of }\alpha\text{-olefin charged}} \times 100$$

The mole percent of α-olefin that is consumed in the alkylation of the heterocyclic N-vinyl moieties is determined by the following equation:

(3) The minium (a) and the maximum (b) mole percent of the α-olefin consumed in the alkylation=
  (a) the results of Equation 1 subtracted from the results of Equation 2(b).
  (b) the result of Equation 1 subtracted from the result of Equation 2(a).

The mole percent of the heterocyclic N-vinyl moieties, that are alkylated on the average, is determined by the following equation:

(4) The minimum(a) and the maximum (b) mole percent of the heterocyclic N-vinyl moieties alkylated on the average=

(a)

$$\frac{\text{Moles of }\alpha\text{-olefin charged}\times\text{the result of Equation 3}(a)}{\text{Moles of N-vinyl monomer charged}}\times 100$$

(b)

$$\frac{\text{Moles of }\alpha\text{-olefin charged}\times\text{the result of Equation 3}(b)}{\text{Moles of N-vinyl monomer charged}}\times 100$$

Equations 2 to 4 inclusive, may be simplified as follows:

(2)

$$\text{Min. }(a)=\frac{\text{moles of N-vinyl monomer charged}/100}{\text{moles of }\alpha\text{-olefin charged}}\times 100$$

$$\text{Max. }(b)=\frac{\text{moles of N-vinyl monomer charged}/10}{\text{moles of }\alpha\text{-olefin charged}}\times 100$$

(3)

Min. $(a)$=result of Equation 1—result of Equation 2$(b)$
Max. $(b)$=result of Equation 1—result of Equation 2$(a)$ (4)

$$\text{Min. }(a)=\frac{\text{moles }\alpha\text{-olefin charged}\times\text{result of Equation 3}(a)\times 100}{\text{moles of N-vinyl monomer charged}}$$

$$\text{Max. }(b)=\frac{\text{moles }\alpha\text{-olefin charged}\times\text{result of Equation 3}(b)\times 100}{\text{moles of N-vinyl monomer charged}}$$

The copolymers obtained by the simultaneous copolymerization and alkylation reaction are characterized by the folowing formulae as determined from the systematic quantitative study and from the structural studies of numerous reaction products:

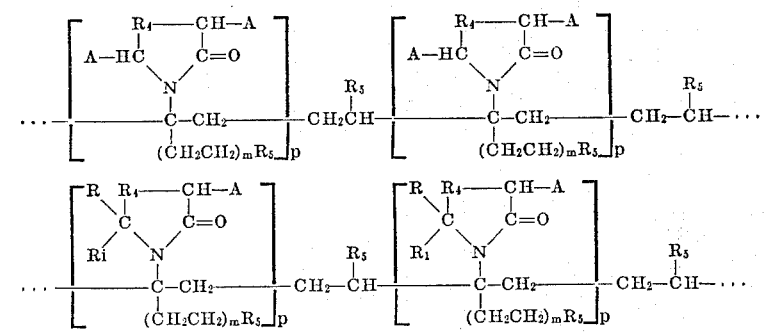

substitutents designated by the values R and $R_1$ above as follows:

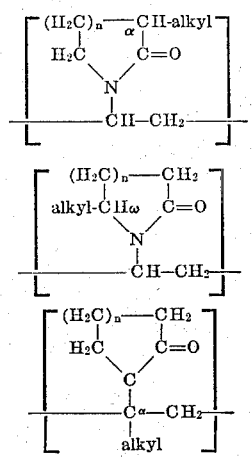

Mono-alkylation predominantly takes place when a high molar ratio of heterocyclic N-vinyl monomer to $\alpha$-olefin of at least 2 carbon atoms or halo-$\alpha$-olefin is employed in the simultaneous copolymerization and alkylation reaction. When 0.02 to 0.1 mole of $\alpha$-olefin or halo-$\alpha$-olefin is employed per mole of heterocyclic N-vinyl monomer, mono-alkylation predominantly takes place at random positions in the heterocyclic moiety of the copolymer yielding isomeric 1:1 adducts as illustrated above. In other words, the monoadducts (1:1) are isomeric with respect to the position of the substitution (alkylation). For example, with an N-vinyl moomer of a 5-, 6- or 7-membered heterocyclic ring system (lactam) characterized by the foregoing general formula, and an $\alpha$-olefin or halo-$\alpha$-olefin, random mono-alkylation takes place on the carbon atoms wherein R and $R_1$ have the same values as heretofore, $R_4$ represents the atoms necessary to complete a 5-, 6- or 7-membered ring, $R_5$ is either hydrogen or alkyl of from 1 to 180 carbon atoms, $p$ is a numeral ranging from 10 to 100 and wherein the $m$'s independently represent a numerical value of 0 to 1; when $m$ is zero, $R_5$ is hydrogen; when $m$ is 1, $R_5$ is either hydrogen or alkyl of about 1 to about 180 carbon atoms, and wherein at least one of the $m$'s in at least one of the heterocyclic N-vinyl moieties has the value of 1.

From the foregoing formulae, it will be apparent to those skilled in the polymer art that the value of $p$ will depend primarily upon the reactivity ratios of the individual heterocyclic N-vinyl monomers and the $\alpha$-olefins or halo-$\alpha$-olefins employed in the simultaneous copolymerization and alkylation reaction.

The active sites on the N-heterocyclic monomer moieties in the copolymers of the above formulae that are randomly alkylated (substituted by an alkyl group of from 2 to 180 carbon atoms) is best illustrated with N-vinyl lactam moieties in such copolymers that are free from lower alkyl alpha and omega to the carbonyl and on the $\alpha$-vinyl carbon atoms of the lactam moiety in said copolymer. Random mono-alkylation begins as the copolymerization reaction is initiated and continues after the copolymerization has been completed.

Where the N-vinyl monomer of a 5-, 6- or 7-membered heterocyclic ring system employed in the reaction contains 1 or 2 alkyl groups of from 1 to 2 carbon atoms in omega position to the carbonyl in the lactam moiety (as designated by the values R and $R_1$ above), neglibible mono-alkylation takes place in this position. In such case, the mono-alkylation takes place primarily on the carbon atom alpha to the carbonyl and alpha vinyl carbon atom of the lactam moiety.

When 0.2 to 10 moles of $\alpha$-olefin of at least 2 carbon atoms are employed per mole of N-vinyl monomer of a 5-, 6- or 7-membered heterocyclic ring system, random mono-alkylation, di-alkylation, tri-alkylation, as well as polyalkylation take place at the aforementioned positions of the lactam moiety in the copolymer.

Di-alkylation and tri-alkylation are exemplified by the following illustrations:

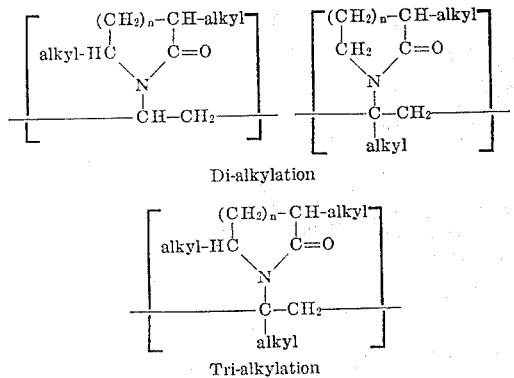

Di-alkylation

Tri-alkylation

When 4 moles or more of an alpha-olefin or halo-α olefin are consumed per mole of monomeric N-vinyl lactam free from lower alkyl substitutents as designated by the values R and $R_1$ above, alkylated copolymeric N-vinyl lactams are obtained in which on the average one or more of the three positions in the lactam moieties will contain an alkyl group of at least 2 carbon atoms to as many carbon atoms as is contained in the alpha-olefin employed.

Since propagation occurs at a given alkylation site, i.e., one or more additional moles of α-olefin add to the first mole of α-olefin which has added to the lactam moiety, such propagation is termed polyalkylation as distinguished from mono-, di- and tri-alkylation. The tendency towards polyalkylation (propagation) increases as the ratio of α-olefin to lactam moiety increases and as the chain length of the α-olefin decreases. For example, when simultaneously copolymerizing and alkylating an N-vinyl lactam with ethylene, the molar ratio of the latter propagated in the same positions as above described for the isomeric 1:1 adducts may range from 3:1, 4:1, 5:1 and 6:1. The 4:1 is exemplified by the following illustration:

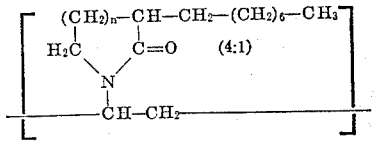

With 1 mole of N-vinyl lactam and from 0.2 to 10 moles of 1-butene, substitution at the above-described positions takes place to yield a butyl, or octyl or dodecyl group in the lactam moiety of the copolymer.

While the foregoing illustrations were directed to a monomer of N-vinyl lactam, it is to be noted that the same mono-alkylation, di-, tri- and polyalkylation take place on heterocyclic N-vinyl moieties over than lactams. The non-lactam N-vinyl monomers, such as N-vinyl-2-morpholinone, contains active protons in both 3 and 6 positions as well as on the α-vinyl carbon atom, N-vinyl oxazolidone contains an active proton in 5-position as well as on the α-vinyl carbon atom, N-vinyl-succinimide, N-vinyl diglycolylimide and N-vinyl glutarimide contain an active proton in alpha position to the carbonyl as well as on the α-vinyl carbon atom. With such N-vinyl monomers alkylation takes place at the active sites.

From the extensive studies and findings, it will be readily appreciated, depending upon the molar ratio of the reactants, that alkylated copolymeric N-vinyl lactams and alkylated copolymers of other heterocyclic N-vinyl monomers are obtained in which some or all of the carbon atoms alpha and omega to the carbonyl and alpha-vinyl carbon atom of the lactam and of the heterocyclic N-vinyl moiety constituting the copolymer contain at least one alkyl group of at least 2 carbon atoms.

The alkylated copolymers prepared in accordance with the present invention are new products which possess the varying degrees of solubility in polar and non-polar solvents, but insoluble in water, and which find many new and useful applications as will be noted hereinafter.

The new alkylated copolymers differ in solubility characteristics from conventional polymeric N-vinyl lactams, i.e., (1) those prepared by homopolymerizing N-vinyl lactams which do not contain from 1 to 2 alkyl groups of from 1 to 2 carbon atoms in the lactam moiety, and (2) those which contain 1 to 2 of such alkyl groups in the lactam moiety, in that the latter two are soluble in water but insoluble in aliphatic and aromatic hydrocarbons, mineral oil, petroleum ether, ethyl ether, etc., whereas the alkylated copolymers obtained in accordance with the present invention and containing at least one alkyl group of from 2 carbon atoms up in the N-vinyl lactam moiety are insoluble in water, but soluble in aliphatic and aromatic hydrocarbons such as n-hexane, n-heptane, benzene, toluene, kerosene, mineral oils, and in petroleum ether, ethyl ether, etc. The same applies to copolymers of the conventional N-vinyl lactams and other monoethylenically unsaturated polymerizable monomers. For example, copolymers of 65 mole percent of vinyl pyrrolidone and 35 mole percent of vinyl acetate and 60 mole percent of vinyl pyrrolidone and 40 mole percent of methyl acrylate are partially soluble in water, but insoluble in carbon tetrachloride, n-hexane and mineral oils.

The average molecular weights of the alkylated copolymers obtained in accordance with the present invention vary from 5,000 (K10) to about 50,000 (K40). The ease of solubility of the alkylated copolymers in aliphatic and aromatic hydrocarbons increases as the chain length of the α-olefin increases from 2 carbon atoms up.

It is interesting to note that by employing 1 mole of a specific N-vinyl lactam such as, for example, N-vinyl-2-pyrrolidone (VP) with varying molar ratios ranging from 0.11 to 1.8 mole of an α-olefin of from 4 to 20 carbon atoms in the reaction, a variety of alkylated copolymers having differing physical characteristics are obtained as may be noted from the following table:

TABLE 1.—1 MOLE OF N-VINYL-2-PYRROLIDONE REACTED WITH—

| | 1 mole $C_{20}α$-olefin | 1.8 mole $C_{16-20}α$-olefin | 0.45 mole $C_{16-20}α$-olefin | 0.11 mole $C_{16-20}α$-olefin | 0.5 mole $C_4α$-olefin | 0.22 mole $C_4α$-olefin |
|---|---|---|---|---|---|---|
| Physical Form at 25° C. | Waxy solid | Straw-colored viscous liquid | Off-white solid | White granular solid | Off-white granular solid | White granular solid |
| Density gm./cc. at 23° C. | 0.95 | 0.90 | 0.98 | 1.03 | 1.09 | 1.09 |
| Average Mol. Weight | 8,600 | 7,300 | 9,500 | 20,000 | 19,000 | 16,000 |
| Softening Point, °C. | 30 | | 30 | 120 | 121 | 157 |
| Melting range (Mannheim Block)° C. | 32–36 | | 83–90 | 146–152 | 131–140 | 188–195 |

| SOLUBILITY BASED ON 10% OF ALKYLATED COPOLYMER IN LISTED SOLVENTS | | | | | | |
|---|---|---|---|---|---|---|
| Water | Insol | Insol | Insol | Emulsion | Dispersible [1] | Dispersible [1] |
| Ethanol | Insol | Partly Sol | Sol | Sol | Sol | Sol |
| Toluene | Sol | Sol | Sol | Partly Sol | Partly Sol | Dispersible [1], Sol. Hot |
| Mineral Oil | Sol | Sol | Sol | Partly Sol | Partly Sol | Insol |
| Tetrachloroethylene | Sol | Sol | Sol | Sol. Hot | D.C. [2] | Insol |

[1] Dispersible denotes stable cloudy solution. [2] D.C. dispersible cold.

The following examples will show how the various N-heterocyclic monomers are simultaneously copolymerized and alkylated. All parts given are by weight unless otherwise noted.

For the sake of simplicity, the lubricating oil of paraffins stock having a Saybolt viscosity of 100 seconds marketed by the Socony Mobil Oil Company as "100 sec. solv." will be referred to hereinafter as "100 sec. solvent."

It is to be noted that the isomeric distribution shown in the examples is based on the findings of the systematic quantitative study.

EXAMPLE I

Into a one-liter, four-necked flask, equipped with stirrer, thermometer, nitrogen inlet and reflux condenser, the following ingredients were charged:

N-vinyl-2-pyrrolidone, 111 grams (1.0 mole)
α-Eicosene, 140 grams (0.5 mole)
Methyl isobutyl carbinol, 200 grams
Di-t-butyl peroxide, 11.0 grams (0.075 mole)

The flask was then purged with nitrogen and heated. When the temperature reached around 120° C. an exothermic reaction initiated, but the temperature was controlled and maintained at 120–135° C. After 16 hours of reaction, the experiment was discontinued and the contents analyzed. The results showed the absence of any N-vinyl-2-pyrrolidone and 2.73% by weight of the solution of unreacted α-eicosene, corresponding to 91% consumption. The product after the total removal of the solvent and volatiles is a waxy solid at room temperature. It is soluble in alcohols and aliphatic and aromatic hydrocarbons, but insoluble in water.

On the basis of Equation 1, the calculation showed that 86.45% of the α-eicosene charged was consumed in the copolymerization and alkylation reaction.

The minimum and maximum role percent of α-eicosene copolymerized, as calculated by Equations 2(a) and 2(b), are 2.0% and 20%, respectively.

The minimum and maximum mole percent of α-eicosene consumed in the alkylation of the N-vinyl-2-pyrrolidone moieties, as calculated by Equations 3(a) and 3(b), are 66.45% and 84.45%, respectively.

The minimum and maximum mole percent of the N-vinyl-2-pyrrolidone moieties that were alkylated on the average, as calculated by Equations 4(a) and 4(b), are 33.22% and 42.22%, respectively.

The N-vinyl-2-pyrrolidone moieties in the copolymer that were alkylated on the average showed the following isomeric distribution:

| Position substitution: | Percent |
|---|---|
| Eicosyl in 3-position | 70–80 |
| Eicosyl in 5-position | 10–5 |
| Eicosyl on α-vinyl carbon atom | 20–15 |

EXAMPLE II

Into a one-liter, four-necked flask equipped with stirrer, thermometer, nitrogen inlet and reflux condenser, the following ingredients were charged and the flask then purged with nitrogen and heated:

N-vinyl-2-pyrrolidone = 83.2 grams (0.75 mole)
α-Dodecene = 126 grams (0.75 mole)
Normal butanol = 150 grams
Di-t-butyl peroxide = 11 grams (0.075 mole)

The contents of the flask were maintained at 120–125° C. for 12 hours when a second charge of peroxide (5.5 grams, 0.037 mole) was made and the reaction continued for another 12 hours. (Total peroxide=16.5 grams, or 0.11 mole.) The solution was analyzed and found to contain no residual N-vinyl-2-pyrrolidone and only 2.26% by weight of the solution of unreacted α-dodecene corresponding to 93.3% of α-dodecene consumed in the reaction. The contents of the flask were then transferred into a one-liter flask and the solvent stripped in high vacuum. The resulting product is a colorless flexible solid, soluble in aliphatic and aromatic hydrocarbons, esters, ketones, higher alcohols, but insoluble in water.

Based on Equations 1 to 4 inclusive, the calculations showed the following:

| | Percent |
|---|---|
| The mole percent of α-dodecene copolymerized and alkylated | 86.7 |
| Min. mole percent of α-dodecene copolymerized | 1.0 |
| Min. mole percent of N-vinyl-2-pyrrolidone moieties alkylated on the average | 76.7 |

The N-vinyl-2-pyrrolidone moieties in the copolymer that were alkylated on the average showed the following isomeric distribution:

| Position substitution: | Percent |
|---|---|
| Dodecyl in 3-position | 75–85 |
| Dodecyl in 5-position | 15–10 |
| Dodecyl on α-vinyl carbon atom | 10–5 |

EXAMPLE III

Into a one-liter, four-necked flask equipped with stirrer, thermometer, nitrogen inlet and reflux condenser, the following ingredients were charged and the system purged wtih nitrogen:

N-vinyl-2-pyrrolidone, 37 grams (0.33 mole)
α-Dodecene, 336 grams (2.0 mole)
Normal butanol, 200 grams
Di-t-butyl peroxide, 14.6 grams (0.1 mole)

The contents were brought to reflux (120–125° C.) and maintained for 24 hours and then another 14.6 grams (0.1 mole) di-t-butyl peroxide was added and heating continued for 24 more hours. (Total peroxide used=29.2 grams or 0.2 mole.) The contents were then cooled and analyzed. It was found to contain no residual N-vinyl-2-pyrrolidone and only 4.65% by weight of solution of unreacted α-dodecene, corresponding to 91.7% of α-dodecene consumed in the reaction. The product obtained after the removal of all the volatiles in high vacuum, is colorless and viscous fluid soluble in all organic polar and non-polar solvents, but insoluble in water.

EXAMPLE IV

Into a one-liter stainless steel shaker bomb, a prepared solution of 111 grams (1.0 mole) N-vinyl-2-pyrrolidone, 200 grams ethanol and 25 grams (0.17 mole) di-t-butyl peroxide was charged and then the bomb capped and 140 grams of ethylene injected and the bomb sealed. The bomb was heated and maintained at 125–130° C. with shaking for 24 hours. It was then cooled, vented and the contents discharged into a stainless steel pan and placed in vacuum oven. After a continuous drying period of two days at 90° C. (20–30 mm. of mercury) the dried product was analyzed and found to contain no N-vinyl pyrrolidone but 6.8% nitrogen, corresponding to 46% by weight of grafted ethylene in the final copolymerized and alkylated product. The product is a light brown transparent semi-solid soluble in polar and non-polar organic solvents, but insoluble in water.

EXAMPLE V

Into a one-liter, four-necked flask equipped with stirrer, thermometer, nitrogen inlet and reflux condenser, the following ingredients were charged and the system then purged with nitrogen:

N-vinyl-2-pyrrolidone=111 grams (1.0 mole)
α-Eicosene=280 grams (1.0 mole)
Methyl isobutyl carbinol=200 grams
Di-t-butyl peroxide=14.6 grams (0.1 mole)

The contents were maintained at 130–135° C. for 16 hours and then a second addition of 7.3 grams (0.05 mole) peroxide was made and reaction continued for 8 more hours. (Total peroxide=21.9 grams, 0.15 mole.) The solution was cooled and analyzed. The analytical data showed the total absence of N-vinyl-2-pyrrolidone and only 5.48% by weight of solution of unreacted α-eicosene, corresponding to 88% of α-eicosene consumed in the reaction. The contents were subjected to vacuum distillation and as the solvent and volatiles were removed, 391 g. 100 sec. solv. were added. At completion, a clear viscous fluid weighing 780 grams was obtained. On cooling to room temperature the product concentrate turned to a waxy solid, but became a clear fluid on warming.

EXAMPLE VI

Into a one-liter, four-necked flask equipped with stirrer, thermometer, nitrogen inlet and reflux condenser, the following materials were charged:

N-vinyl-2-piperidone=125 grams (1.0 mole)
α-Octadecene=252 grams (1.0 mole)
Normal butanol=200 grams
Di-t-butyl peroxide=14.6 grams (0.1 mole)

The flask was purged thoroughly with nitrogen and heated. The contents were maintained at reflux (120° C. pot) for 30 hours and then cooled and analyzed. The analyses showed the total absence of N-vinyl-2-piperidone and the presence of only 3.05% by weight of solution of unreacted α-octadecene, corresponding to 92.9% of α-octadecene consumed in the reaction.

When all solvent and volatiles were stripped in vacuum, a clear viscous fluid weighing 371 grams was obtained.

| | Percent |
|---|---|
| The mole percent of α-octadecene copolymerized and alkylated | 88.26 |
| Min. mole percent of α-octadecene copolymerized | 1.0 |
| Min. mole percent of N-vinyl-2-piperidone moieties alkylated on the average | 78.26 |

The N-vinyl-2-piperidone moieties in the copolymer that were alkylated on the average showed the following isomeric distribution:

| Position substitution: | Percent |
|---|---|
| Octadecyl in 3-position | 60–70 |
| Octadecyl in 6-position | 25–20 |
| Octadecyl in α-vinyl carbon atom | 15–10 |

EXAMPLE VII

Into a one-liter, four-necked reaction flask, equipped with stirrer, thermometer, nitrogen inlet and reflux condenser, the following materials were charged:

N-vinyl-ε-caprolactam=139 grams (1.0 mole)
α-Octadecene=214 grams (0.85 mole)
Methyl isobutylcarbinol=200 grams
Di-t-butyl peroxide=18.5 grams (0.127 mole)

The flask was then purged thoroughly with nitrogen, heated and maintained at 125–135° C. for 24 hours. The contents when analyzed showed the absence of N-vinyl-ε-caprolactam and the presence of 4.54% by weight of the solution of unreacted α-octadecene, corresponding to 81.5% of α-octadecene consumed in the reaction. After stripping the solvent and volatiles in vacuum, the product obtained is a very viscous fluid soluble in all non-polar solvents.

| | Percent |
|---|---|
| The mole of α-octadecene copolymerized and alkylated | 77.43 |
| Min. mole percent of α-octadecene copolymerized | 1.17 |
| Min. mole percent of N-vinyl-ε-caprolactam moieties alkylated on the average | 55.8 |

The N-vinyl-ε-caprolactam moieties in the copolymer that were alkylated on the average showed the following isomeric distribution:

| Position substitution: | Percent |
|---|---|
| Octadecyl in 3-position | 50–60 |
| Octadecyl in 7-position | 30–25 |
| Octadecyl on α-vinyl carbon atom | 20–15 |

EXAMPLE VIII

Into a one-liter, four-necked flask equipped with stirrer, thermometer, nitrogen inlet and reflux condenser, after a thorough nitrogen purge, the following ingredients were charged and heated:

N-vinyl-5-methyl-2-pyrrolidone=125 grams (1.0 mole)
Hexanol (mixture of isomeric hexanols)=200 grams
α-Octadecene=227 grams (0.9 mole)
Di-t-butyl peroxide=15 grams (0.1 mole)

The solution was maintained at 120–140° C. for 30 hours and then cooled and analyzed. It was found to contain less than 0.1% by weight of monomer and only 6.0% by weight of solution of unreacted α-octadecene, corresponding to 85% consumption in the reaction. After stripping the organic solvent and volatiles in vacuum, the product is a very viscous fluid at room temperature. It is soluble in all non-polar solvents, but insoluble in water.

| | Percent |
|---|---|
| The mole percent of α-octadecene copolymerized and alkylated | 80.75 |
| Min. mole percent of α-octadecene copolymerized | 1.11 |
| Min. mole percent of N-vinyl-5-methyl pyrrolidone moieties alkylated on the average | 62.6 |

The N-vinyl-5-methyl pyrrolidone moieties in the copolymer that were alkylated on the average showed the following isomeric distribution:

| Position substitution: | Percent |
|---|---|
| Octadecyl in 3-position | 80–90 |
| Octadecyl in 5-position | Negligible |
| Octadecyl on α-vinyl carbon atom | 20–10 |

EXAMPLE IX

Into a one-liter, four-necked flask equipped with stirrer, thermometer, nitrogen inlet and reflux condenser, after a thorough nitrogen purge, the following ingredients were charged:

N-vinyl-2-oxazolidone=56.5 grams (0.5 mole)
Methyl isobutylcarbinol=200 grams
α-Eicosene=210 grams (0.75 mole)
Di-t-butyl peroxide=11.0 grams (0.075 mole)

The mixture was then heated and maintained at 120–140° C. for 12 hours and the another 11.0 grams (total peroxide=22.0 grams, 0.15 mole) peroxide added and the reaction continued. After a total of 28 hours' reaction period, the contents were cooled and analyzed. It was found to contain 0.1% by weight of solution of residual N-vinyl oxazolidone and 3.44% of unreacted α-eicosene, corresponding to 92% consumption of the α-eicosene. The product, after stripping the solvent and volatiles in vacuum, is a viscous fluid while hot, solidifying upon cooling to room temperature to a waxy solid. It is soluble in aliphatic and aromatic hydrocarbons, but insoluble in water.

EXAMPLE X

Into a one-liter, four-necked flask equipped with stirrer, thermometer, nitrogen inlet and reflux condenser, the following ingredients were charged:

N-vinyl-3-morpholinone = 63.5 grams (0.5 mole)
Normal butanol = 150 grams
α-Hexadecene = 224 grams (1.0 mole)
Di-t-butyl peroxide = 15 grams (0.1 mole)

The flask was purged with nitrogen, heated and maintained at reflux (118°–124° C.) for 16 hours. Then another 7.0 grams peroxide were added (total peroxide = 22.0 grams, 0.15 mole) and refluxing continued for 20 more hours (total = 36 hours). The contents were then cooled and analyzed. It was found to contain 0.05% by weight of solution of residual N-vinyl-3-morpholinone and 4.7% of unreacted α-hexadecene, corresponding to 90.3% consumption of α-hexadecene in the reaction. This product was soluble in a variety of polar and non-polar organic solvents.

EXAMPLE XI

Into a one-liter, four-necked flask equipped with stirrer, thermometer, nitrogen inlet and reflux condenser, the following ingredients were charged:

N-vinyl succinimide = 62.5 grams (0.5 mole)
Methyl isobutylcarbinol = 150 grams
α-Eicosene = 182 grams (0.65 mole)
Di-t-butyl peroxide = 15 grams (0.1 mole)

The flask was purged with nitrogen, heated and maintained at a range of 120–140° C. for 30 hours. The contents were then cooled and analyzed and found to contain only a trace of N-vinyl succinimide and 3.66% by weight of solution of unreacted α-eicosene, corresponding to 91.8% consumption of α-eicosene in the reaction. After stripping the solvent and volatiles in vacuum, the product is a viscous fluid while hot, solidifying upon cooling to room temperature to a waxy solid. It is soluble in all non-polar solvents, but insoluble in water.

|  | Percent |
|---|---|
| The mole percent of α-eicosene copolymerized and alkylated | 87.21 |
| Min. mole percent of α-eicosene copolymerized | 0.77 |
| Min. mole percent of N-vinyl succinimide moieties alkylated on the average | 100 |

The N-vinyl succinimide moieties in the copolymer that were alkylated on the average showed 80–90% eicosyl substitution in the 3-position (in both of the alpha to carbonyl carbon atoms) and 10–20% eicosyl substitution on the α-vinyl carbon atom.

EXAMPLE XII

N-vinyl-2-pyrrolidone (111 grams, 1 mole) were dissolved in 250 grams of anhydrous ethanol and then 14.6 grams (0.1 mole) of di-t-butyl peroxide added and the solution transferred into a one-liter stainless steel rocker bomb. Chlorotrifluoroethylene ($CClF=CF_2$) 60.0 grams (0.51 mole) was then charged to the bomb and the bomb heated and maintained at 125°–130° C. for 24 hours. After cooling, the contents were discharged into a one-liter, four-necked flask and subjected to vacuum distillation to remove solvent and light boiling components. The dry solid obtained as residue analyzed for 13.3% of fluorine and 7.7% of chlorine corresponding to 27% of the chlorotrifluoroethane by weight of the product.

EXAMPLE XIII

Into a one-liter, four-necked flask equipped with stirrer, thermometer, nitrogen inlet and reflux condenser, the following materials were charged:

N-vinyl-2-pyrrolidone = 111.0 grams (1.0 mole)
α-Octene = 112.21 grams (1.0 mole)
Normal butanol = 200 grams
Di-t-butyl peroxide = 14.6 grams (0.1 mole)

The flask was purged thoroughly with nitrogen and heated. The contents were maintained at reflux for 30 hours and then cooled and analyzed. The analysis showed the total absence of N-vinyl-2-pyrrolidone and the presence of only 3% by weight of solution of unreacted α-octene, corresponding to 88.1% consumption of the α-olefin.

After stripping in vacuum the solvent and volatiles, the product is a flexible solid, soluble in petroleum ether, mineral oils, toluene, benzene, and polar solvents, but insoluble in water.

EXAMPLE XIV

Into a one-liter, four-necked flask equipped with stirrer, thermometer, nitrogen inlet and reflux condenser, the following materials were charged:

N-vinyl-2-pyrrolidone = 55.5 grams (0.5 mole)
$C_{42}$ α-olefin obtained by the trimerization of α-tetradecene = 294 grams (0.5 mole)
Methyl isobutylcarbinol = 120 grams
Di-t-butyl peroxide = 15 grams (0.1 mole)

The flask was purged thoroughly with nitrogen and heated. The contents were maintained at reflux for 24 hours and then cooled and analyzed. The analysis showed the total absence of N-vinyl-2-pyrrolidone and only 7.75% by weight of the solution of unreacted $C_{42}$ α-olefin, corresponding to 87.2% consumption of the α-olefin.

When all solvent and volatiles were stripped in vacuum, an amber colored wax was obtained which is soluble in mineral oil and other non-polar solvents.

From the foregoing specification and illustrative working examples, it becomes clearly evident that by the simultaneous copolymerization and alkylation process of the present invention, the solubility of the alkylated copolymers is systematically controlled, both by the type of α-olefin used and the amount thereof, so that copolymers which are still soluble in polar solvents such as alcohols to copolymers which are soluble in aliphatic hydrocarbons, mineral and lubricating oils can be obtained as well as copolymers having intermediate degrees of solubility between polar and non-polar solvents. Thus, copolymers with a low degree of alkyation can be obtained which are still soluble in ethanol so that they can be formulated with "Freons" as aerosol hair sprays, but their sensitivity to moisture is reduced. For example, heterocyclic N-vinyl monomers which are copolymerized and alkylated with ethylene, propylene or 1-butene to the extent of 15% to 30% α-olefin by weight yield copolymers that are soluble in anhydrous ethanol and can be formulated with "Freons" as aerosol hair sprays having increased moisture resistance. In other words, the simultaneous copolymerization and alkylation of such monomers with α-olefins of from 2 to 4 carbon atoms to the specified degree of alkylation yield copolymers which are more flexible and less tacky under high humidity conditions than conventional homopolymers of N-vinyl pyrrolidone or N-vinyl pyrrolidone/vinyl acetate copolymers. The flexibility of the alkylated copolymers increases and the tack at high humidity decreases as the degree of alkylation increases. These copolymers can also be formulated into adhesives with superior properties because of their increased resistance to moisture.

Polymers with a high degree of alkylation are soluble in lubricating oils and are useful as sludge dispersants and viscosity index improvers. The latter polymers are also soluble in hydrocarbon polymers such as polyethylene and impart dye receptivity to these difficultly dyed polymers.

The alkylated copolymers, including those obtained by copolymerization and alkylation of heterocyclic N-vinyl monomers with lower alpha-olefins, are compatible at all levels with epoxy resins, polystyrene, polyvinyl acetate, and with copolymers of vinyl chloride and vinyl acetate.

The heterocyclic N-vinyl monomers when simultaneously copolymerized and alkylated with α-olefins of from 8 to 42 carbon atoms yield lube-oil additives which not only improve the viscosity index of lubricating oils, but also impart thereto excellent sludge and corrosion inhibiting properties. Of particular utility in this regard are the alkylated copolymers prepared by the simultaneous copolymerization and alkylation of 0.5 equivalent of N-vinylpyrrolidone with 0.35 mol of α-eicosene, one equivalent of N-vinylpiperidone with one mole of α-dodecene, and 0.25 equivalent of N-vinyl-α-caprolactam with 0.3 mole of α-hexadecene.

The alkylated copolymers in which at least 25 mole percent of the heterocyclic N-vinyl moieties in the copolymer are alkylated on the average by at least one alkyl substituent of from 10 to 42 carbon atoms, display emollient properties, i.e., softening and soothing effect when applied to the skin and the appendages of the skin. In view of this characteristic, they are excellent additives to soaps and cosmetic preparations of the cleansing, conditioning and embellishing type which will impart a smooth texture as well as a softening and soothing effect to the skin and skin appendages. The alkylated copolymers can be used in place of, and in addition to, petroleum hydrocarbons, i.e., mineral oils, petrolatums and paraffin waxes. They are not only soluble in these petroleum hydrocarbons, but also soluble in other unctuous materials such as fatty acids; stearic, myristic oleic acids, etc.; glyceryl monostearate (Glycosterin); lanolin (wool fat); beeswax and other animal and vegetable waxes; higher alohols, such as hexanol, myristyl alcohol, etc.; polyoxyalkylene glycols, e.g., polyoxyethylene glycol, polyoxypropylene glycol; methyl ethyl ketone, Cellosolve, butyrolactone, etc., which are employed in toiletry preparations of this type. They are readily emulsified by the usual reagents employed in toiletry manufacture. By virtue of this solubility, emulsifiability and broad compatibility with other components of the toiletry preparation, they substantially reduce or eliminate the drying tendency of mineral oils and petrolatums present in such preparations. The presence of the additive (alkylated copolymer) in toiletry preparations containing paraffin wax eliminates the clogging of pores. Regardless whether the toiletry preparation contains any one or all of these petroleum hydrocarbons, vegetable oils, lanolin, and/or other unctuous components, or is free from such components, etc., the presence of the additive in such preparation imparts a much smoother texture to it with the attendant softening and soothing effect when applied to the skin and a softening effect when applied to skin appendages.

The amount of alkylated copolymer that is employed to effect the desired results (smoother texture with softening and soothing effects) ranges from about 0.1% to about 50% by weight based on the total weight of the completed toiletry preparation. The alkylated copolymers are added at any stage of manufacture of cold creams, cleansing creams, emollient creams, finishing creams, skin-softening lotions, hand cleaners, lubricating creams, overnight creams, absorption-base creams, hand creams and lotions, foot creams, baby creams, baby skin oils; special creams, such as astringent creams, bleaching creams, acne creams; protective creams (industrial creams), lotion or aerosol skin protective coatings, aerosol bandage sprays, vanishing creams, foundation creams, brushless shaving creams, shaving preparations, after-shave lotions and sprays, medicated creams, deodorants and anti-perspirants, such as deodorant creams and lotions, roll-on deodorants, sunburn preventives, suntan preparations, paste or lotion rouges, cream rouges, massage oils, facial masks, depilatories, i.e., hair removers (epilating wax compositions) and hair removing creams, paste or lotion face makeup, face powders; eye makeup, i.e., eye shadows and eyebrow creams; fingernail creams and cleaners, hair bleaches and tints, cuticle softeners, hair conditioners, wave sets, hair dressings, hair brilliantines; hair oils, hair sprays, creams and shampoos, nail polish removers, lipsticks, perfume sticks, facial soaps, synthetic soap bars, antiseptic soaps (tincture of green soap), insect repellents, protective hand creams, waterless hand cleaners, dentifrice, pet shampoos, bath talcs, and the like. They are helpful in stabilizing aqueous foams in toiletry preparations such as soap bars, shaving creams, etc.

Toiletry preparations containing the alkylated copolymer render the preparation smoother in texture and easier in application to the skin and its appendages (hair and nails). After application to the skin or scalp, the preparations leave the skin soft and pliable with a soothing effect which remains after the preparation is removed by washing with soap and water. After application to the hair, the preparation deposits a film which renders the hair smooth, soft, lustrous and alive-looking. The soft and smooth effects remain after washing with soap and water and enhance the manageability of the hair. After application of the nail preparations, the nails are smooth and the adjacent skin rendered soft and pliable with a soothing effect. The alkylated copolymers are effective pigment dispersers and act as color receptors in rouges and lipsticks.

In hair preparations the presence of the alkylated copolymer improves the softness, water repellency and manageability of the hair. In hair conditioners, the alkylated copolymers may be added to creams, foams or gels and the resulting preparations pressurized with nitrogen, argon, or the usual liquefied fluorochloro-hydrocarbons.

In view of their solubility in hydrocarbons, mineral oils, etc., the alkylated copolymers are particularly adaptable for use as hot melts alone or in combination with paraffin waxes as coatings for various fibrous materials. Extruded films from such alkylated copolymers, either alone or with waxes and resins, may be composited to paper and other fibrous or textile materials. The alkylated copolymers are compatible with a wide variety of resins, waxes, and polymers at room or elevated temperatures. They are useful as binders and saturants in hard board and particle board.

Copolymers, in which at least 60% of the heterocyclic N-vinyl moieties alkylated on the average by an alkyl group of from 18 to 42 carbon atoms, are useful for the protection of wires and cables in the form of outer jackets and sheets. Films or coatings of such alkylated copolymers are also useful as liners for metal or fiber drums for shipping moist, dusty or corrosive product. They are also useful in electrical equipment such as in electric cable insulation, in potting dopes for capacitor elements, and as insulating coatings, sealing compounds, and in moisture-proofing coils, resistors and paper capacitors; as caulking compounds, spreader-sticker for insecticidal compositions, water-proofing sealants, adhesives, water-proofing, gum and resin plasticizers, paper coatings, metal rolling and as dispersants for inks and dye pastes. They are useful in leather treatment as dye assistants, dye stripping agents, textile water-proofing, textile warp size, and the like.

Emulsions of the alkylated copolymers are especially useful in the impregnation of paper. When mixed in amounts ranging from about 1 to 3% by weight in light mineral oils, the alkylated copolymers function effectively as penetrants in the removal of rusty and frozen nuts and bolts.

The alkylated copolymers are especially adaptable in dye stripping, as pigment dispersants and protective colloids, temporary protective coatings, coatings for paper, binders for detergent briquettes and as binders for tablets and as color dispersants in tablet coating. Films of the alkylated copolymers, from aqueous dispersion or emulsion, are effective for spraying various plants so as to protect them during transplanting or prevent rapid transpiration during sunny and relatively warm winter months.

The alkylated copolymers are useful in dispersing gums, resins and various types of polymers. They are particularly adaptable in lubricating oils as sludge dispersers, and as bonding agents for paper, plastics and textile fabrics. They are very useful as anti-redeposition agents in detergents, as detergent hydrotropes and/or pacifiers, in dry cleaning detergents, foam stabilizers for shampoos, stabilizers for high density and low density liquid detergents, foam stabilizers for mist drilling of oil or gas wells, latex stabilizers, hydraulic fluid emulsion stabilizers, suspending agents and protective colloids for polymer emulsions and in emulsion polymerization reactions, inhibitors for clay hydration slushing, oil corrosion inhibitors, engine oil rust inhibitors, complexing agents for liquid-liquid extraction, dye receptors for polypropylene, dye fixing agents, pigment dispersants and protective colloids in pigment printing, fluidizing agents for paper coating slurries, pitch dispersant; adhesives in place of starch, casein, synthetic latices and the like; antistatic agents for polystyrene, polyethylene, polypropylene and other plastics, tackifiers for polyolefins and other plastics, flexibilizing agents for phenolic and other thermosetting resins, dispersants and gloss improvers in floor wax polishes, thickening agents in non-aqueous systems, as membranes for desalting and filtration, as adhesion promotors for paperboard to nylon and as dye receptors for Creslan. They are useful as additives to natural and synthetic waxes to lower melt viscosity, improve dispersibility, flexibility, gloss, or hardness. They are useful as ink acceptors for surface printing of high density polyethylene bottles, absorbents for tobacco tars in cigarette filters, absorbents for toxic gases and vapors; complexing agents for dyestuffs, phenolic compounds and heavy metal ions; thickeners for petroleum oils and oil base paints; flocculating agents in sewage treatments, as coating for adhesive tapes and as components in adhesive hot melts, melting point depressants for natural and synthetic resins, as reinforcing agents for glues and as reducers of the hydrophilic character of polar resins.

The alkylated copolymers are excellent dye receptors for polyolefin fibers such as polyethylene, polypropylene and polybutene. They are also excellent for sizing polypropylene filament and spun yarns in view of their good adhesive properties on polypropylene surfaces. They add strength and good dyeing properties when employed with rayon, both viscose and acetate. They are excellent sizers for glass fibers since they have the adhesion due to the N-vinyl lactam units but better lubricity because of the alkyl units. The alkylated copolymers improve the gloss of waxes and polishes. They are better soil suspending agents than the corresponding unalkylated polymers in synthetic detergents. They are especially useful in the de-emulsification of crude oil emulsions. They are useful as soil dispersing agents for synthetic fibers. In the textile industry, they are useful as adhesives, anti-static agents, lubricants, dye assistants, dye leveling agents and as filament spinning finishes. They are also useful as tackifiers, plasticizers, flocculators of ore fines, etc., as gelling agents and as beverage clarifiers.

The alkylated copolymers display dispersing and detergent properties when incorporated into petroleum products at a concentration of about 0.03% to 5% by weight, such as kerosene, fuel oils, jet fuels and other combustible hydrocarbon liquids. They readily disperse gums, resins (asphaltenes) in such products.

The alkylated copolymers are also useful as mold release lubricants, as anti-tack and anti-block agents, as lubricants and anti-static agents for films and textile fibers, and as flattening, softening and sizing agents for textiles. They are compatible with petroleum resins and the mixture employed in water-proofing, pipe coating compounds, and as concrete curing compounds to insure the deposition of a water-proof membrane. In carbon paper, the alkylated copolymers serve as a vehicle for carrying the color and prevent the ink from soaking completely into the paper. Polyethylene containing sodium bicarbonate and the alkylated polymers in which the lactam units contain alkyl groups of from 6 to 10 carbon atoms can be extruded coaxially with a core to give a foam-sheathed cable. They are especially useful as cell control agents in polyurethane foam.

The alkylated copolymers form halogen adducts with elemental iodine, iodine monochloride and iodine monobromide. The iodine adducts are prepared by gently heating the alkylated copolymer until it melts and with constant stirring adding elemental iodine or a solution of elemental iodine in alcohol or carbon tetrachloride or a mixture thereof. From 1 to 12% of iodine by weight of alkylated copolymer may be incorporated to the molten copolymer. The resulting iodine adduct is soluble in a pharmaceutical grade mineral oil and other unctuous materials. The iodine adduct may be incorporated in powders, ointments, salves, suppositories, and toiletry preparations (cosmetics and soaps) to yield antiseptic and germicidal compositions which impart a soft, smooth and softening effect to the skin.

The alkylated copolymers are useful additives to automobile polishes to increase gloss and as rust inhibitors in priming and finishing paints for metals. The alkylated polymers are readily chlorinated by conventional procedures to yield a new and useful class of polymers having fire-retarding properties.

The alkylated copolymers when incorporated into nonanionic and anionic surfactants in amounts ranging from about 3 to 5% by weight of the surfactant, counteract the defatting tendencies and the accompanying chapping appearance when in contact with human skin, by leaving the skin soft and pliable with a soothing effect, which remains after several rinsings of water.

While the present specification has shown the simultaneous copolymerization and alkylation of a large class of heterocyclic N-vinyl monomers, N-vinyl lactams other than those illustrated above may be employed in the copolymerization and alkylation with an $\alpha$-olefin or halo-$\alpha$-olefin of at least two carbon atoms. Such monomers include N-vinyl alkyl-substituted derivatives of lactams, for example, 4,4-dimethyl-2-pyrrolidone; 3,3-dimethyl-2-pyrrolidone; 3-ethyl-2-pyrrolidone; 3,5-dimethyl-2-pyrrolidone; 3-methyl-2-pyrrolidone; 4-methyl-2-pyrrolidone, 3,3,5-trimethyl-2-pyrrolidone; 5,6-dimethyl-2-piperidone; 4-ethyl-2-piperidone; 3-methyl-6-ethyl-2-piperidone; 3-methyl-2-piperidone; 4-methyl-2-piperidone; 3,6-dimethyl-2-caprolactam; 4,6-dimethyl-2-caprolactam; 4,7-dimethyl-2-caprolactam; 3-ethyl-2-caprolactam; 5-ethyl-2-caprolactam; 6-ethyl-2-caprolactam; 4-ethyl-6-methyl-2-caprolactam; 6-methyl-2-caprolactam; 4-methyl-6-ethyl-2-caprolactam; 3-methyl-2-caprolactam; 4-methyl-2-caprolactam; and 6-methyl-2-caprolactam. Despite the fact that some of these monomers contain an alkyl group in either alpha and/or omega positions to the carbonyl, any one of the latter two positions free from such alkyl substituents as well as the alpha-vinyl carbon atom will nevertheless be copolymerized and alkylated to yield copolymers containing at least one additional alkyl substituent of at least 2 carbon atoms in the lactam moieties of said copolymers.

The copolymeric haloalkylates of heterocyclic N-vinyl monomers and halo-$\alpha$-olefins of at least 2 carbon atoms are also a new and useful class of products having fire-retardant properties. They are especially useful in the formulation of fire-retardant adhesives, i.e., bonding agents for paper, plastics and textile fabrics. From solutions in a variety of organic solvents or as emulsions, the haloalkylated copolymers form smooth continuous films which make them particularly useful as fire-retardant precoating agents for polyester laminates.

We claim:

1. Alkylated linear copolymer of 5- to 7-membered heterocyclic N-vinyl monomer and $\alpha$-olefin comprising recurring structural units selected from the clause consisting of those having the following formulae:

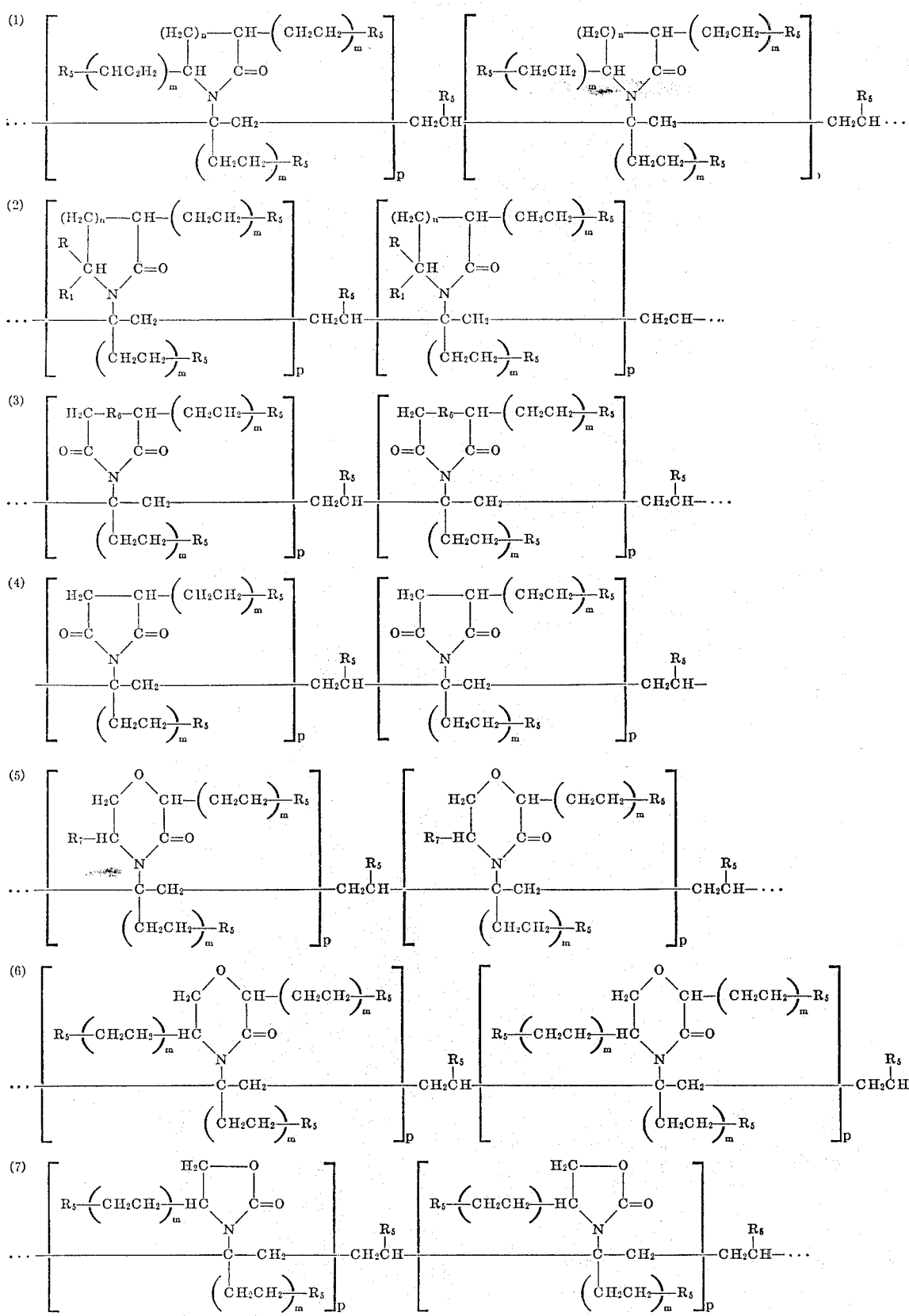

wherein R and $R_1$ are selected from the class consisting of hydrogen, methyl and ethyl, $R_5$ is selected from the class consisting of hydrogen and alkyl of from 1 to about 180 carbon atoms, $R_6$ is a member selected from the class consisting of an oxy and methylene group, $R_7$ is selected from the class consisting of methyl and ethyl, $n$ is an integer of from 1 to 3 and $p$ is an integer of from 10 to 100, and wherein the $m$'s independently represent a numerical value of 0 to 1; when $m$ is zero, $R_5$ is hydrogen; when $m$ is 1, $R_5$ is selected from the group consisting of hydrogen and alkyl of from 1 to about 180 carbon atoms, and wherein at least one of the $m$'s in at least one of the heterocyclic N-vinyl moieties has the value of 1, said alkylated copolymer having a molecular weight of at least 5,000.

2. Alkylated copolymer of N-vinyl lactam and α-olefin comprising recurring structural units having the following formula:

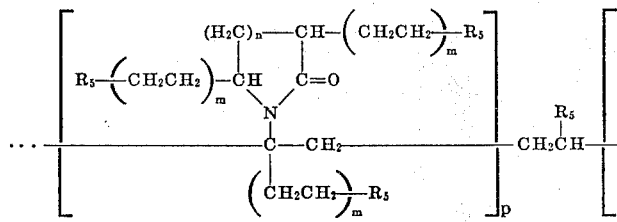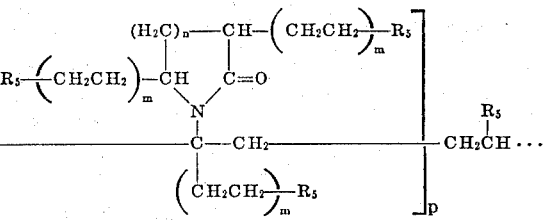

wherein $R_5$ is selected from the group consisting of hydrogen and alkyl, of from 1 to about 180 carbon atoms, $n$ is an integer of from 1 to 3 and P is an integer of from 10 to 100, and wherein the $m$'s independently represent a numerical value of 0 to 1; when $m$ is zero, $R_5$ is hydrogen; when $m$ is 1, $R_5$ is selected from the group consisting of hydrogen and alkyl of from 1 to about 180 carbon atoms, and wherein at least one of the $m$'s in at least one of the N-vinyl lactam moieties has the value of 1, said alkylated copolymer having a molecular weight of at least 5,000.

3. Alkylated copolymer of N-vinyl lactam and α-olefin comprising recurring structural units having the following formula:

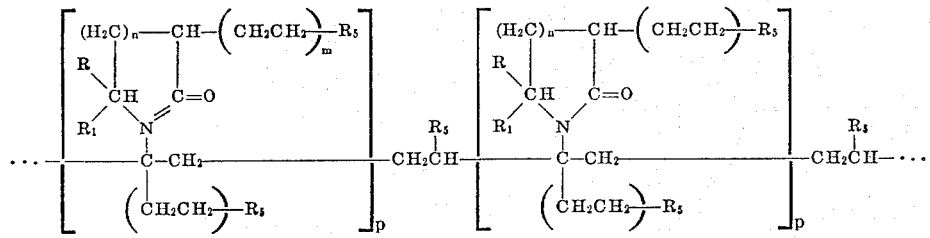

wherein R and $R_1$ are selected from the group consisting of hydrogen, methyl and ethyl, $R_5$ is selected from the group consisting of hydrogen and alkyl, of from 1 to about 180 carbon atoms, $n$ is an integer of from 1 to 3 and $p$ is an integer of from 10 to 100, and wherein the $m$'s independently represent a numerical value of 0 to 1; when $m$ is zero, $R_5$ is hydrogen; when $m$ is 1, $R_5$ is selected from the group consisting of hydrogen and alkyl of from 1 to about 180 carbon atoms, and wherein at least one of the $m$'s in at least one of the N-vinyl lactam moieties has the value of 1, said alkylated copolymer having a molecular weight of at least 5,000.

4. Alkylated copolymer according to claim 2 wherein the N-vinyl lactam is N-vinyl-2-pyrrolidone.

5. Alkylated copolymer according to claim 3 wherein the N-vinyl lactom is N-vinyl-5-methyl-2-pyrrolidone.

6. Alkylated copolymer according to claim 2 wherein the N-vinyl lactam is N-vinyl-2-piperidone.

7. Alkylated copolymer according to claim 2 wherein the N-vinyl lactam is N-vinyl-ε-caprolactam.

8. Alkylated copolymer according to claim 1 wherein the 5-membered heterocyclic N-vinyl monomer is N-vinyl succinimide.

9. The process of simultaneously copolymerizing and alkylating 5- to 7-membered heterocyclic N-vinyl monomers having a carbonyl function adjacent to the nitrogen in its heterocyclic moiety with α-olefins which comprises heating one mole of said heterocyclic N-vinyl monomer with 0.05 to 10 moles of an α-olefin of from 2 to about 180 carbon atoms in solution of an organic solvent common to the said heterocyclic N-vinyl monomer and α-olefin in the presence of 0.025 to 0.30 mole of an organic peroxide catalyst per mole of said α-olefin at a temperature ranging from 80° to 200° C.

10. The process of simultaneously copolymerizing and alkylating an N-vinyl lactam with an α-olefin which comprises heating one mole of an N-vinyl lactam with 0.05 to 10 moles of an α-olefin of from 2 to about 180 carbon atoms in solution of an organic solvent common to the said N-vinyl lactam and α-olefin in the presence of 0.025 to 0.30 mole of an organic peroxide catalyst per mole of said α-olefin at a temperature ranging from 80° to 200° C.

11. The process according to claim 10 wherein the N-vinyl lactam is N-vinyl-2-pyrrolidone.

12. The process according to claim 10 wherein the N-vinyl lactam is N-vinyl-5-methyl-2-pyrrolidone.

13. The process according to claim 10 wherein the N-vinyl lactam is N-vinyl-2-piperidone.

14. The process according to claim 10 wherein the N-vinyl lactam is N-vinyl-ε-caprolactam.

15. The process according to claim 9 wherein the 5-membered heterocyclic N-vinyl monomer is N-vinyl succinimide.

16. The process of simultaneously copolymerizing and alkylating N-vinyl-2-pyrrolidone with α-eicosene which comprises heating one mole of said pyrrolidone with 0.5 mole of α-eicosene in solution of methyl isobutylcarbinol in the presence of 0.075 mole of di-t-butyl peroxide at a temperature of 120°–135° C.

17. The process of simultaneously copolymerizing and alkylating N-vinyl-5-methyl-2-pyrrolidone which comprises heating one mole of said pyrrolidone with 0.9 mole of α-octadecene in solution of hexanol in the presence of 0.1 mole of di-t-butyl peroxide at a temperature of 120°–140° C.

18. The process of simultaneously copolymerizing and alkylating N-vinyl succinimide which comprises heating one mole of said succinimide with 1.3 moles of α-eicosene in solution of methyl isobutylcarbinol in the presence of 0.2 mole of di-t-butyl peroxide at a temperature of 120°–140° C.

19. The process of simultaneously copolymerizing and alkylating N-vinyl-2-piperidone which comprises heating one mole of said piperidone with 1 mole of α-octadecene in solution of n-butanol in the presence of 0.1 mole of di-t-butyl peroxide at a temperature of 120° C.

20. The process of simultaneously copolymerizing and alkylating N-vinyl-ε-caprolactam which comprises heating one mole of said caprolactam with 0.85 mole of α-octadecene in solution of methyl isobutylcarbinol in the presence of 0.127 mole of di-t-butyl peroxide at a temperature of 125° to 135° C.

21. Alkylated copolymer according to claim 2 wherein $R_5$ is alkyl of from 2 to 40 carbon atoms.

22. Alkylated linear copolymer of 5- to 7-membered heterocyclic N-vinyl monomer having a carbonyl function adjacent to the nitrogen in its heterocyclic moiety, comprising recurring structural units having the following formula:

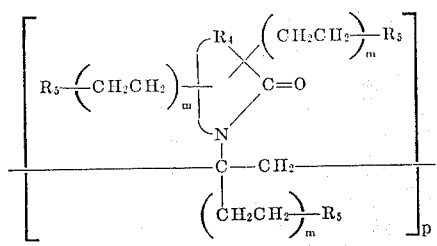 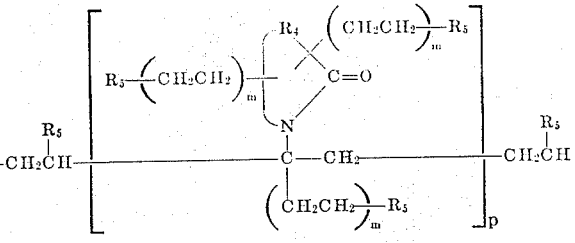

wherein $R_4$ represents the radical necessary to complete a 5- to 7-membered heterocyclic ring system selected from the class consisting of

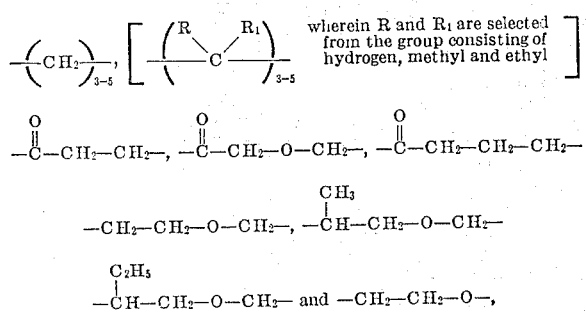

$$-\overset{O}{\underset{\|}{C}}-CH_2-CH_2-,\ -\overset{O}{\underset{\|}{C}}-CH_2-O-CH_2-,\ -\overset{O}{\underset{\|}{C}}-CH_2-CH_2-CH_2-$$

$$-CH_2-CH_2-O-CH_2-,\ -\overset{CH_3}{\underset{|}{C}H}-CH_2-O-CH_2-$$

$$-\overset{C_2H_5}{\underset{|}{C}H}-CH_2-O-CH_2-\ \text{and}\ -CH_2-CH_2-O-,$$

$R_5$ is selected from the group consisting of hydrogen and alkyl of from 1 to about 180 carbon atoms and $p$ is an integer of from 10 to 100, and wherein the $m$'s independently represent a numerical value of 0 to 1; when $m$ is 0, $R_5$ is hydrogen; when $m$ is 1, $R_5$ is selected from the group consisting of hydrogen and alkyl of from 1 to about 180 carbon atoms, and wherein at least one of the $m$'s in at least one of the heterocyclic N-vinyl moieties has the value of 1 in at least one of the positions selected from the group consisting of alpha and omega carbon atoms to the said carbonyl and alpha-vinyl carbon atom in said moieties, said alkylated copolymer having a molecular weight of at least 5,000.

References Cited

UNITED STATES PATENTS

| | | | |
|---|---|---|---|
| 2,667,473 | 1/1954 | Morner et al. | 260—88.3 |
| 2,821,519 | 1/1958 | Glickman | 260—88.3 |
| 3,003,845 | 10/1961 | Ehlers | 260—88.1 |
| 3,174,955 | 3/1965 | Black | 260—88.3 |

JOSEPH L. SCHOFER, *Primary Examiner.*

HARRY WONG, JR., *Assistant Examiner.*

U.S. Cl. X.R.

260—33.4, 33.6, 86.7, 86.3, 87.5, 87.7, 326.5, 33.2; 117—122, 138.8, 155, 139.5; 161—247; 424—78; 64, 71; 252—56, 54.6, 51.5, 50, 52; 424—62, 73, 43, 65; 8—160, 161